(12) United States Patent
Zacher (10) Patent No.: US 12,375,305 B2
(45) Date of Patent: Jul. 29, 2025

(54) METHOD AND SYSTEM FOR AUTHENTICATION OF A COMPUTING DEVICE

(71) Applicant: Marc Gaston Zacher, Würzburg (DE)

(72) Inventor: Marc Gaston Zacher, Würzburg (DE)

(73) Assignee: UHLMANN & ZACHER GMBH, Waldbüttelbrunn (DE)

( * ) Notice: Subject to any disclaimer, the term of this patent is extended or adjusted under 35 U.S.C. 154(b) by 0 days.

(21) Appl. No.: 18/106,813

(22) Filed: Feb. 7, 2023

(65) Prior Publication Data

US 2023/0299981 A1  Sep. 21, 2023

Related U.S. Application Data

(63) Continuation of application No. PCT/EP2021/071901, filed on Aug. 5, 2021.

(30) Foreign Application Priority Data

Aug. 11, 2020  (EP) .................................... 20190504

(51) Int. Cl.
H04L 29/06 (2006.01)
H04L 9/00 (2022.01)
H04L 9/32 (2006.01)

(52) U.S. Cl.
CPC ............ *H04L 9/3273* (2013.01); *H04L 9/006* (2013.01); *H04L 9/3247* (2013.01)

(58) Field of Classification Search
CPC ..... H04L 9/3273; H04L 9/006; H04L 9/3247; H04L 9/3271; H04L 2209/805; H04L 9/08; H04L 9/0819; H04L 5/0087; H04L 9/0822; H04L 9/30; H04L 63/0435; H04L 63/0442; H04L 63/045; H04L 63/0485; H04L 2463/062; H04L 63/061; G07C 2009/00412; G07C 2009/0088; G07C 9/00309; G07C 9/00571; G07C 9/00817; G06F 21/305; G06F 21/445;
(Continued)

(56) References Cited

U.S. PATENT DOCUMENTS 9,589,405 B2   3/2017  Cabouli et al.
11,162,793 B2 * 11/2021  Giurgiu ................ G08G 1/0129
(Continued)

FOREIGN PATENT DOCUMENTS

EP   1710753 A2  10/2006
EP   2584539 A1   4/2013
(Continued)

OTHER PUBLICATIONS

Wikipedia, Digital Signature, https://en.wikipedia.org/wiki/Digital_signature, retrieved Aug. 5, 2020, 12 pages.
(Continued)

*Primary Examiner* — Joseph P Hirl
*Assistant Examiner* — Leynna Truvan
(74) *Attorney, Agent, or Firm* — Quarles & Brady, LLP; Yakov S. Sidorin (57) ABSTRACT

A nested data package issued by an administrative controller and configured to enable paring an electronic lock with a mobile computing device. A method for generating such nested data package.

17 Claims, 3 Drawing Sheets

(58) Field of Classification Search
CPC ........... G06F 2211/007; H04M 1/2757; H04M 15/8214; H04M 2215/782; H04N 1/00217; H04N 1/4486; H04N 19/66; H04N 1/32272; H04N 2201/3281; H04N 7/1675; H04N 21/63345; G05B 2219/25216; G11B 7/0079; G11B 20/00536; H04W 12/106; H04W 12/03; H04W 12/0471; H04H 60/23; H04Q 2213/13339; H04Q 2213/339
See application file for complete search history.

(56) References Cited

U.S. PATENT DOCUMENTS

| | | | |
|---|---|---|---|
| 2018/0248704 A1 | 8/2018 | Coode et al. | |
| 2018/0367522 A1* | 12/2018 | Nix | H04L 63/062 |
| 2020/0186366 A1 | 6/2020 | Klink et al. | |
| 2020/0275513 A1* | 8/2020 | Park | H04W 76/22 |
| 2021/0406387 A1* | 12/2021 | Batcher | G06F 21/606 |

FOREIGN PATENT DOCUMENTS

| | | |
|---|---|---|
| EP | 3362931 B1 | 3/2020 |
| WO | 03071060 A1 | 8/2003 |
| WO | 2006021914 A1 | 3/2006 |
| WO | 2009030816 A1 | 3/2009 |
| WO | 2017066409 A1 | 4/2017 |

OTHER PUBLICATIONS

PCT International Search Report and Written Opinion, PCT/EP2021/071901, Sep. 15, 2021, 12 pages.

* cited by examiner

METHOD AND SYSTEM FOR AUTHENTICATION OF A COMPUTING DEVICE

CROSS-REFERENCE TO RELATED APPLICATIONS

This application is a continuation of the pending International Application No. PCT/EP2021/071901 filed on Aug. 5, 2021 and now published as WO 2022/033959, which designates the United States and claims priority from European Patent Application No. 20190504.9 filed on Aug. 11, 2020. The disclosure of each of the above-identified patent documents is incorporated by reference herein.

BACKGROUND

1. Field of the Invention

The invention relates to the of field electromechanical door locks and in particular to a method for pairing and/or unpairing an electromechanical lock with a mobile computing device such as, e.g., a cell phone, a tablet computer, a smart watch or the like. The invention further relates to a data package for pairing and/or unpairing.

2. Description of Related Art

Electronic locks ("locks" for short) become more and more popular as they allow for lean access management of infrastructure such as offices, flats, hotel rooms, safes, cars, manufacturing sites, etc. Corresponding locking systems include at least one user device with an electronic identification for authentication of a user. The electronic identification is transmitted from the user device to the lock and if the key is considered valid by the lock, the lock changes its state from unlocked to locked or from locked to unlocked. The electronic identification takes the function of a mechanical key in a purely mechanical locking system. Presently, most electronic locking systems use so called RFID-transponders as user devices. There exist numerous applications explaining different aspects of this technique (see e.g. EP 1 710 753 A2, WO 03/071060 A1, EP 2 195 767 A1, EP 1 787 241 B1 to name only a few).

These lock systems have one thing in common: An administrator can issue a transponder to a user and has to pair the transponder with all locks which the user shall be able to unlock and/or lock. Pairing and issuing preferably takes place essentially at the same time. In case the authorization is withdrawn, the administrator has to "unpair" the transponder with the respective locks. Pairing means herein that the information is provided to the lock that a particular transponder (and hence the user using the transponder) is authorized, e.g. for locking and/or unlocking the lock. This information is referred to herein as pairing information. Unpairing is hence the removal of an authorization, or in more detail to provide the information to the lock that a particular transponder is no longer authorized. Authorizations provided by the pairing information may be limited, for example to particular times and/or calendar days (see e.g. EP 2 584 539 A) or may need confirmation by a PIN ("personal identification number") or a scan of a physiologic feature (such as a fingerprint scan, iris-scan or the like). As well, in case an authorization is withdrawn, we refer to this information as pairing information, for linguistic simplicity only (unless we explicitly distinguish between pairing and unpairing). In practice, the administrator typically has a master transponder ("master key") enabling to bring the lock in a pairing mode. In the pairing mode, pairing information (e.g. electronic identification for example a transponder ID) for a transponder may be provided to the lock. As well, pairing information may be changed, e.g. to withdraw a permission to lock and/or unlock the lock. A paired transponder communicates with the lock and provides its authorization information to the lock. Based on the authorization information, the lock can identify a paired transponder and allow the user being authenticated by the authorization information to change the state of the lock. The authorization information can be said electronic identification or some information that can be obtained (preferably uniquely) from the electronic identification.

These locks, however, are often distributed over large areas, e.g. multiple buildings. These multiple buildings may even be located in different towns, countries or even on different continents. Hence, it has been suggested to connect the locks to a non-locally constrained data network such as, e.g. the internet, which would generally enable an administrator to send pairing information directly to the respective locks, from remote. This connection, however, requires expensive hardware and is difficult to maintain by battery powered locks. Further, a non-local data network connection of the lock increases the risk of a successful attack on the lock's integrity, because a lock being connected to the internet is exposed to hacking attempts via the internet.

A drawback of increasing use of electronic access control is the increasing number of different transponders a user has to carry to enable him to open all doors the user has access to, as almost every entity such as employer, sports club, video club, flat manger, etc. uses a different transponder system. To address these concerns, it has been suggested to use short range communication channels (e.g. Bluetooth, Bluetooth LE, NFC-communication, ZigBee, Z-Wave, ...) of mobile computing devices such as smartphones, tablet computers and the like for communication between these mobile devices and a lock generally enabling the owner of the respective mobile device transmit an electronic key to a lock enabling the user to lock and unlock an lock (see e.g. U.S. Pat. No. 9,589,405B2). Most of these publications address the additional security which can be added to lock systems by including biometric scans being performed by the mobile computing device prior to unlocking a door. For example, in addition to being paired with the respective lock, unlocking takes place only in case a biometric scan such as fingerprint scan, a facial recognition or the like confirms not only the smart phone to be entitled for operating the lock but as well the present user of the smart phone. Further, a so-called relay attack can be avoided, as the "key" function of the mobile device is usually activated actively by the user of the mobile device, e.g. by pressing a but button of the mobile device.

These systems generally work well and are very convenient, but the so far unsolved difficulty is to safely pair a remote lock with a particular smart phone, without risking that a third person would be enabled to 'hijack' a lock by taking the identity and without urging the administrator to physically visit the location the lock is installed.

EP 3 362 931 A1 discloses a method for safely updating a firmware of an electronic locking device. An identifier of the locking device is associated with a user profile of a person. The firmware of the electronic locking device is updated when the identifier of the locking device matches the identifier associated with the user profile.

US 2018/248704 A1 relates to a method for safely operating a lock controller. When a mobile device comprising a data package containing lock access data and a digital certificate enters a vicinity of the lock controller, the mobile device wirelessly transmits the lock access data to the lock controller using the digital certificate for encrypting the wireless transmission.

US 2020/186366 A1 suggests a method for enabling a lock controller. The lock controller has a physical mark attached to the lock controller comprising lock information with a lock identifier. A mobile device is used for retrieving the lock information by scanning the physical mark and transmitting the lock information to a remote server. The transmission is encrypted asymmetrically using two pairs of a private key and a public key generated and provided by of the lock controller and of the remote server, respectively.

SUMMARY

The problem to be solved by the invention is to ease pairing and unpairing a first computing device with another second computing device, e.g. with an electronic lock without compromising security.

Pairing a mobile computing device with an electronic lock means to provide the information that the particular mobile computing device is authorized to unlock the electronic lock (for brevity we will use the term "unlock" and consider the term "unlock" to be equivalent to "lock and/or unlock"). Unlocking requires that the lock is enabled to identify the particular mobile computing device based on some authentication information transmitted by a first controller to the lock. For simplicity, we will refer to the particular (preferably mobile) computing device as "the first controller". The first controller is very briefly summarizing a (preferably portable) computing device with a CPU, a tangible non-transitory memory storage (hereinafter, "memory" for short) and a first physical port configured to enable communication via at least a first communication channel with an administrative controller and by a second communication channel with at least one lock, more generally referred to as second controller. Sometimes locks are grouped, i.e. these locks of a group provide access to a single key or a group of keys. Typical first communication channels are internet connections, e.g. via Wi-Fi, LTE or the like and typical second communication channels are, e.g. Bluetooth (in any version), NFC (Near Field Communication), and other (preferably shorter range) communication techniques, such as ZigBee, Z-Wave, or the like. The invention is, however, neither limited by the constraint that the first and second communication channels use different protocols nor that they use different physical ports (e.g. antennas). But the examples render the concept more vivid and using different communication channels enhances security. For simplicity, the reader may assume that the first controller is a smartphone having multiple ports (e.g. antennas) to different communication channels (Wi-Fi, LTE, NFC, Bluetooth, USB, . . . ) enabling a bidirectional communication with other electronic devices, such as, e.g. an administrative controller as well as with a lock having a corresponding physical port (hereinafter "port" for short) for establishing the respective communication channel. Preferably, the first communication channel provides an internet connection (e.g. via Wi-Fi, LTE, Ethernet, . . . ). As well preferably, the second communication channel enables communication only in a locally constrained range. The local constraint can be defined by a maximum distance $d_{max}$ between the first controller and the second controller. For example $d_{max}$ can be an element of a set, e.g. $d_{max}/m \in \{100, 50, 30, 15, 10, 5, 2.5, 1, 0.5, 0.25\}$, wherein m is as usual the SI-unit "meter".

The term electronic lock is generalized herein as the "second controller", as already introduced above. Like the first controller, the second controller has a CPU and a tangible non-transitory memory storage (hereinafter, "memory" for short) and a (second) physical port enabling communication via at least the second communication channel with the first controller. The first and the second controllers are configured to establish a bidirectional data link via the second communication channel, enabling the exchange of information, typically via data packages. In practical applications, the second communication channel is preferably selected to enable a communication only if the first controller is in the proximity of the second controller. Proximity may be understood as a distanced between first and the second controllers being smaller or equal than $d_{max}$, i.e. $d \le d_{max}$. The second controller is preferably configured to provide or deny access to some resource, such as a piece of information, a door or the like. So to speak, the second controller is an electronic lock protecting the information or the access to a room, a safe, money or any other item. Thus, we will refer to the process of providing the access as unlocking and removing the access as locking. Like the locks, second controllers can as well form groups as already indicated above. Thus, the second controller may be a member of a group of second controllers providing access to different 'locked' resources but which can be jointly unlocked by the same key or a group of keys, wherein each key of the group 'unlocks' the resource.

In practice, the pairing information enabling unlocking (i.e. "locking and/or unlocking") a particular lock by a first controller is provided by the administrator of the locking system. The administrator uses an administrative controller, i.e. some sort of electronic computing device being configured to send data to and preferably receive data from the first controller, e.g. via an internet connection, text message or any other communication channel to the first controller. Hence, the administrative controller can submit data packages to the first controller. A data package can include freight data. Examples of such freight data are pairing information and/or authorization information required for unlocking the second controller by the second controller and/or the first controller, respectively.

Thus, the administrative controller could transmit pairing information to the first controller via the first communication channel, e.g. via an internet connection. Once the first controller is in the vicinity of the second controller ($d \le d_{max}$), the first controller can transmit and hence forward the pairing information to the second controller, for example via the second communication channel, e.g. using Bluetooth (in any version), NFC, ZigBee, Z-Wave or a similar technology. Accordingly, the drawbacks of a direct connection between the administrative controller and the second controller (e.g. a lock) like an increase in energy consumption and increased vulnerability can be avoided.

Preferably, the pairing information is sent from the administrative controller to the first controller as a component of a nested data package, wherein the paring information is encrypted in the nested data package and wherein the key for decrypting the pairing information is available to the second controller, but preferably not available to the first controller. Thereby, security is enhanced as will be explained in more detail with respect to the examples below. In case the system includes multiple second controllers (e.g., multiple locks at different sites), the key for decrypting the pairing information may be shared by all second controllers or by a group of second controllers, however, it is preferred that the key for decrypting the pairing information is known only by the respective (single) second controller. Other second controllers preferably have different corresponding decryption keys.

In other words, the nested data package enables to provide pairing information or other freight data from an administrative controller to at least one second controller using the first controller as a transporter. In more detail, the data package enables the administrative controller to provide the pairing information or other freight data to the first controller using a first data link (via a first communication channel, e.g. an ethernet connection, a Wi-Fi, cellular or any other physical data connection. The first controller can thus be at a remote location relative to the administrative controller (but this is not a condition). A user of the first controller, e.g. a user of a smartphone, may then physically transport the nested data package being stored in the memory of the (user's) first controller to the location of the second controller, for example to a door being equipped with the corresponding second controller (e.g. an electronic lock), by physically moving the first controller in the vicinity ($d \leq d_{max}$) of the second controller, thereby enabling to establish a second data link. Using the second data link (e.g. an NFC, Bluetooth, IR, or whatever kind of communication channel), the pairing information can be provided via the first controller to the second controller, without almost no chance of a third party gaining knowledge of the pairing information.

As will be apparent below, the data package is preferably a nested data package, having a number n (preferably $n \geq 1$) of nested data layers (sub packages). Some of the information provided by these layers can be read only by the first controller. The information thereby provided to the first controller enables the first controller to identify a second controller as the intended second controller to which the pairing information is intended to be sent by the administrative controller. It can thus be avoided that the freight data is delivered to a non-authorized lock or generally to an unintended second controller. Further, the first controller can deliver the pairing information (or other (second) freight data) without being able to use it, as second freight data can be nested in an encrypted layer of the nested data package and the first controller preferably fails to have the corresponding key, being known (preferably only) by the second controller. The data package of the invention thus enables a reciprocal identification of the first controller and the second controller being initialized by the administrative controller. It comes without saying that the data package and/or parts thereof can be stored by the administrative controller, the first controller and/or the second controller as required, which controller is within the scope of the invention. In another example, the data package can be stored on some other storage device like a flash drive, an USB-memory stick, a hard disk, a solid state disk (SSD), a RAM, a ROM, etc, which storage device is within the scope of the invention.

The nested data package preferably includes at least a first data layer. The first data layer may preferably be asymmetrically encrypted using a public key of the first controller. This public key of the first controller is herein referred to as first public key. A message being encrypted using the first public key can only be decrypted using a complementary first private key, being known by the first controller, preferably only. This means that the pair of first public and private keys are preferably or have preferably been generated by the first controller. The first public key can be transmitted to the administrative controller, e.g., via the first communication channel. The administrative controller may encrypt the first data layer A1 of the nested data package A0 using the first public key. The first data layer A1 can thus be decrypted by the first controller, preferably only.

The nested data package A0 as an outer layer may include at least one digital signature of the administrative controller enabling to verify the administrative controller as originator of the first data layer A1. Referring to the outer layer of the nested data package A0 hence means that the respective signature is not included in the lower level data layer A1 (but there may be one or more other signature/s in the lower level layers A1 to A4).

As usual in the technical field, herein, a digital signature, or signature for short, is data being logically assigned to signed information, wherein the data enables to verify the origin of signed information by the signor. So called digital signatures mostly use cryptographic methods and can be considered as a scheme for verifying the authenticity of digital messages or documents. For example, a signature may be a portion of the zeroth layer A0 (the outer layer) and/or of the first layer. In this example, this means that the first layer A1 may have been signed prior and/or after encryption. Digital signature methods are known in the art, an introduction can be found e.g. en.wikipedia.org/wiki/Digital_signature (retrieved on Aug. 5, 2020).

The first data layer A1 may include at least identification information of the second controller (second identification information, for short), e.g. a unique ID of the second controller (second ID) and/or a first challenge C1 and an expected response R1 to said first challenge C1 and/or a public key of the at least one second controller (enabling to generate a first challenge C1 by the first controller). For example, the first challenge C1 may be a message to be decrypted using a private key of the second controller. The message can be included in the first layer or be generated by the first controller. For example, the message is a random number being generated by the first controller.

Optionally or alternatively a second data layer A2 may be included and hence nested in the first data layer A1, wherein the second data layer A2 is preferably encrypted. The encryption may be an asymmetric encryption using a public key of the second controller (second public key, for short), hence it can be decrypted only using the second controller's private key (second private key, for short). Alternatively, the encryption can be symmetric. However, in any case, the decryption key is preferably kept secret and known only by the second controller (asymmetric encryption) or known only by the second controller and the administrative controller (symmetric encryption). In any case the decryption key is preferably hidden (=not shared) with the first controller. Thus, preferably only the second controller is configured to decrypt the second layer A2. At this point it is noted that of course each second controller of a group of second controllers may have access to the second public key and/or second private key, wherein "to have access to" or "known by" intends to express that the corresponding data is stored in a memory of the second controller which can be read by the second controller's CPU.

In a preferred example, the first data layer includes a second symmetric key enabling the first controller to transmit symmetrically encrypted information to the second controller. The second symmetric key is preferably shared with the second controller upon initial installation, e.g. in the factory or may have been programmed into the second controller upon delivery by the administrator. This has the advantage that any communication between the first controller and the second controller can be encrypted.

Summarizing, the first controller can receive the nested data package A0 and decrypt it, thereby obtaining the first data layer A1 comprising the second identification information ID1 and/or the second data layer A2, wherein the second data layer A2 is preferably still encrypted, i.e., the information in the second data layer A2 is preferably not accessible to the first controller. The key for decrypting the second data layer is preferably not known to the first controller.

The first controller may, e.g., next transmit the first challenge C1 to the second controller and receive in return a first response R1' from the second controller. If the first response R1' matches the expected first response R1 (i.e., if R1'=R1), the first controller communicates with the correct, i.e. intended second controller (e.g. with the intended electronic lock). The first challenge C1 and the correspondingly expected first response R1 may be included in the first data layer A1. The second controller is preferably configured to send the expected first response in response to having received the first challenge C1. Pairs of first challenges and matching first responses may have been exchanged initially between the administrative controller and the second controller. Alternatively (or in addition as a second example), a public key $uk_i$ may be included in the first data layer, wherein the corresponding private key $ik_i$ is known preferably only by the second controller. Receiving the public key $uk_i$ as a portion of the first data layer A1 by the first controller enables the first controller to encrypt any (e.g. a random) information I, thereby obtaining (encrypted information $EN(uk_i, I)$, wherein EN maps the tuple $(uk_i, I)$, into the space of encrypted information. Subsequently the encrypted information $EN(uk_i, I)$ may be sent as first challenge C1 from the first controller to the second controller (C1=$EN(uk_i, I)$). The second controller may decrypt the first challenge C1 using its private key and thereby obtain the decrypted information $DE(ik_i, C1)$ as result r. The result r may be submitted as first response R1' (R1'=r=$DE(ik_i, C1)$) from the second controller to the first controller. Sending the first response R1' to the first controller enables the first controller to test if the first response R1' matches the information prior to its encryption (R1=I). In other words, the expected first response R1, may be the initial information before it has been encrypted. Thus, providing knowledge about a public key in the first data layer, wherein the corresponding private key is known (preferably only) to the second controller can be considered as providing a challenge C1 and an expected response R1 or in other words it serves the same purpose, namely to ensure that the first controller is paired only with an second controller according to the administrative controller's instructions, briefly referred to as intended second controller.

In a second variant of the second example, i.e. of the example in which the expected response R1 and the corresponding response R1' are computed by the first and second controllers, respectively, by en- or decrypting complementary information I, $EN(uk_i, I)$ as explained above, the first expected response R1 and the first response R1' are preferably obtained by mapping the information I and the result r obtained by decryption ($DE(ik_i, I)$) by a non-injective function $f$. The subscript index i identifies corresponding public and private keys, which may be used as well for en- and decrypting the communication between the respective controllers (in this case i=1), but they may be a different pair of keys (in this case i≠1). For example, the expected response R1 may be obtained by mapping I using f and the transmitted response R1' is obtained by mapping (using f) the result r as obtained by decryption of the challenge C1. Thus, R1'=$f(r)$ =$f(DE(ik_i, C1))$ and R1=$f(I)$. In this preferred example, the result r as obtained by decryption of the encrypted information $DE(ik_i, EN(uk_i, I))$ cannot be obtained by application of the inverse function of $f$ to the transmitted response R1', because the inverse of the function $f$ does not exist. For example, the non-injective function $f$ may be a checksum and/or a hash function, preferably a cryptographic hash function. The additional mapping step increases security, because an unauthorized listener of the transmissions of C1 and R1' cannot obtain the result r and thus cannot use the result r to correlate the transmitted challenge C1 and the result to thereby obtain information about the public key or the private key. Also, the second controller may not be abused to decrypt any data with its private key.

Both variants of the second example, in which the expected response R1 and the corresponding response R1' are computed by the first and second controllers, respectively can be summarized by R1'=$f(r)$=$f(DE(ik_i, C1))$ and R1=$f(I)$ if the condition "non-injective" on $f$ is released. The first variant of the first example is obtained by defining $f: X \rightarrow X$, $f(x)=x \forall x \in X$.

In addition or alternatively (as a third example), the first controller may send a message, e.g. a random number, to the second controller. This message constitutes a first challenge C1. The second controller digitally signs the first challenge C1 using a private key and sends the signed challenge or only a signature of the challenge back as transmitted response R1'. Using a public key of the second controller, the first controller may verify the signature. In a vivid example of the third example, the digital signature DS may be a function of a hash value $h(C1)$ of the challenge C1 to which the private key $ik_2$ of the second controller has been applied, i.e. DS=$DS(ik_2, h_2(C1))$ this can be considered as a kind of encryption of $h_2(C_1)$ (it is noted that instead of $h_2(C_1)$, C1 may be used, i.e. generalizing $h_2(x)=x$, $\forall x$). Thus, prior to transmitting the first response, the second controller may determine the hash value $h_2$ of the first challenge C1, i.e. $h_2(C_1)$ using a predefined hash function h (here the index of h indicates the number of the controller that applied the hash function to the information to be hashed). The such obtained hash value $h_2(C1)$ may next be mapped using a private key of the second controller in to a digital signature space, thereby obtaining DS=$DS(ik_2, h_2(C1))$. The signature DS may next be transmitted as response R1', i.e. R1'=$DS(ik_2, h_2(C1))$ to the first controller. The first controller may determine the hash value $h_1$ of the first challenge C1 as known by the first controller, thereby obtaining $h_1(C1)$. The first controller may apply the public key to the received response R1', thereby receiving a verification value VS of the signature DS, i.e. VS=$VS(uk_2, R1')$. This verification value can be compared with an expected verification value EVS being generated based on the signed message C1, i.e. EVS=$EVS(C1)$. If $EVS(C1)=VS(uk_2, R1')$ is true, the signature is considered valid. Determining DS=$DS(ik_2, h_2(C1))$ may be considered as some sort of encryption of the hash value $h_2(C1)$. Accordingly, determining $VS(uk_2, R1')$ may be considered as 'decrypting' the previously encrypted hash value, yielding $h_2(C1)$ or a function of $h_2$ to the first controller. Summarizing, if the expected verification value EVS and the verification value V match, i.e. if the first controller determines $PVS(C1)=VS(uk_2, R1')$ to be true, the identity of the second controller can be considered approved and the method may continue. The tupel ($ik_2, uk_2$) may be different from the tupel ($ik_2, uk_2$) used for asymmetric encryption of exchanged data, but may as well be the same. We simply avoided introducing a further index.

Slightly different from the other examples for verifying the identity of the second controller, the transmitted response R1' is not directly compared with an expected response R1 but instead a 'decrypted' transmitted response R1' is compared with the locally calculated value being obtained based on the digitally signed message, which takes the function of the expected response R1. The public key of the second controller to be applied to the digital signature (e.g. an encrypted hash value) may be included in the first freight data and may hence be provided by the administrative controller to the first controller when submitting the nested data package.

In a less preferred variant of the vivid example of the third example, the second private $ik_2$ is not applied to the hash value but instead to the entire first challenge by the second controller (i.e. $h(x)=x \forall x$, see above). In this case, the first controller applies the second public key $uk_2$ to the transmitted response R1' and compares the such treated transmitted response R1' with the initially transmitted first challenge C1. The less preferred example enables to use the second controller as an encryption apparatus, and hence allows third parties to assume the identity of the second controller. Further, with an increasing number of messages being encrypted, the third party gathers increasing information which may be abused to determine the private key of the second controller.

The communication for conducting the challenge and response test between the first and the second controller may preferably take place using a symmetric encryption, wherein the symmetric key has been provided to the first controller as part of the first data layer. The symmetric key may preferably have been stored on the second controller (e.g. the lock) when installing the lock (here as a pars pro toto for the second controller). The symmetric encryption ensures that that no third party may listen to the communication between the first and the second controllers and thereby ensures that the first challenge and the (expected) first response each remain known only to the first and the second controllers and the administrative controller. Once the first controller has decrypted the symmetric key using the first private key, preferably any communication between the first and the second controller may preferably take place using a symmetric encryption based on the symmetric key.

Assuming that the identity of the second controller has been confirmed by the first controller based on the second identification information, e.g. by the challenge and response test, then the first controller (e.g. the smart phone or the like) may send, preferably using the symmetric key to encrypt, the still encrypted second data layer A2 to the second controller. The second data layer A2 may be decrypted by the second controller, using the second private key, preferably only. In case the second data layer A2 has been transmitted using the abovementioned symmetric encryption, the second controller of course first decrypts the symmetrically encrypted message from the first controller to thereby obtain the second data package A2. Subsequently, the second data layer can be decrypted using the second private key by the second controller.

This decryption may provide a third data layer A3 to the second controller, comprising at least a fourth layer A4 and a signature of the administrative controller by which the fourth layer A4 has been signed. If the signature is valid, the information provided in the fourth layer A4 has not been compromised and been initially provided by the administrative controller. If the signature is not valid, the second controller may, e.g. discontinue the pairing process and/or give an alarm signal and/or abort communication with the first controller (e.g. for a given time). In addition or alternatively, an ID of the first controller which transmitted the second data layer (having the invalid signature nested therein) may be added to a blacklist.

The fourth data layer A4 may include the first public key, enabling to send an asymmetrically encrypted message from the second controller to the first controller, wherein the message has been encrypted using the first public key as included in the fourth layer A4. Hence, only the first controller is able to decrypt the asymmetrically encrypted message using the first private key. This message, may, e.g., include a (second) challenge C2. The first controller may respond to the (second) challenge C2 by sending a (second) response R2' (e.g. the first controller ID) being generated by processing the second challenge. If the second response R2' matches an expected second response R2 which may be but is not necessarily included in the fourth layer, the second controller may continue using the second freight data. In addition or alternatively, the first controller may sign the challenge C2 (any kind of message) and send at least the signature as transmitted response R2' to the second controller as explained in detail above as third example of a challenge and response test. Alternatively or in addition a second (or third) challenge and a second (or third) response may be included in the fourth data layer, thereby enabling the second controller to challenge the first controller as explained above without having to calculate the response. The advantage is that the calculation can be replaced by a simple lookup operation.

In other words, after passing the challenge and response test the first controller is 'accepted' to be authorized by the administrative controller and the second freight data to be valid. In case the challenge and response test is not passed, the first controller is considered as not being authorized by the administrative controller. The communication may hence be an attempt to gain unauthorized control over the second controller by passing second freight data from another entity than the administrative controller to the second controller.

The above explained teaching relating to the first challenge and response test based on C1, R1 and R1' can be applied on the second and/or third challenge and response test as well. In particular, the second challenge C2 may be for example any (string of) character(s) R2 being encrypted using the first public key as optionally included in the fourth data layer A4. The expected response R2 may hence be the (string of) character(s) or a non-injective function $f$ of the second decrypted information as explained above with respect to the second example of the first challenge and response test. After receipt of the second challenge C2, the first controller may transmit the decrypted information as actual second response R2' to the second controller. If the expected second response R2 matches the received second response R2' (i.e. if R2=R2'), the second controller confirmed the identity of the first controller. Using the above explained abbreviations, and defining I2 as second information being encrypted the expected response R2 is $R2=f(I2)$ and the transmitted response R2' reads $R2'=f(DE(ik_j, C2))$, wherein $C2=EN(uk_j, I2)$. Generalizing, the $n^{th}$ expected response Rn=$f(In)$, and the transmitted response Rn' reads $Rn=f(DE(ik_j, Cn))$, wherein $Cn=EN(uk_j, In)$, wherein the subscript index j identifies corresponding public and private keys, for example j=n. In addition or alternatively, the first controller may transmit his first ID' to the second controller. If the transmitted first ID I1' matches an expected first ID I1 (I1=I1') being optionally included in the fourth data layer A4, this is another alternative or additional possibility of confirming the identity of the first controller.

The freight data can be, e.g. pairing authorization information allowing to control at least one function of the second controller, e.g. to lock and/or unlock a lock, e.g. for a limited number of times, during defined times and/or without other or no restrictions in response to authorization information transmitted by the first controller to the second controller. The authorization information can be, e.g. a response being transmitted to the second controller by the first controller in response to a challenge, e.g. as explained above. There exist numerous authorization methods in the prior art and any of these can be used, at least in principle.

Very briefly summarizing, the nested data package A0 includes information being initially known by the administrative controller. Pieces of this information are nested in the data package A0 to thereby ensure that only that first or second controller obtains the information being relevant for that particular first or second controller, respectively. The first data layer A1 can be extracted by decryption of the nested data package A0 by the first controller, preferably only, and may include at least a second identification information configured to identify of the second controller (e.g. a first challenge C1, an expected first response R1 to the first challenge C1 when imposed to the second controller, a second controller's ID (second ID) and/or a second public key) and/or a second data layer A2. The second data layer A2 may as well be asymmetrically encrypted using a public key of the second controller (second public key) and may include a third data layer A3. A symmetric encryption of the second data layer may be used instead, provided the corresponding shared key is not known to the first controller, as it would enable a user of the first controller to obtain and potentially amend the information in the lower laying layers of the nested data package. Only for linguistic simplicity, we will assume that an asymmetric encryption has been used. The transmission of the second data layer from the first to the second controller may preferably be tunneled using a symmetric encryption, wherein the symmetric key is known by the first and the second controllers. The symmetric key may be included in the first data layer, i.e. it may be at least a portion of the first freight data.

In any case, the second data layer A2, hence, may include information being available to the second controller, only, after the second layer A2 has been transmitted from the first controller to the second controller.

The third data layer A3 may include at least a digital signature of the administrative controller and a fourth data layer A4. The signature relates to the fourth data layer A4 and the fourth data layer A4 and is in this sense attached to it. Alternatively, the second data layer A2 may include at least a digital signature of the third layer A3 and the third data layer A3, wherein decryption of the third data layer A3 using a private key of the second controller enables to obtain the fourth data layer. In other words, the sequence of signing and encrypting can be swapped without changing the security level. In both examples the second controller can verify that the origin of the data in the fourth layer A4 is the administrative controller and at the same time it is ensured, that no other party than the second controller can use the data in the fourth layer. Swapping the sequence as explained above, however provides the additional advantage that the first controller can verify the originator of the third layer. In case the originator is the administrative controller, the first controller may forward the second layer A2 to the second controller. In case the originator of the third layer A3 is not the administrative controller the first controller may send a warning signal, e.g. to a user, an administrator and/or exit the pairing sequence.

The fourth data layer A4 may include at least the first public key and/or an expected second response R2 of the first controller to a second challenge C2. The second challenge may be included in the fourth data layer and/or be generated based on the information being included in the fourth data layer. Other possibilities of defining the second challenge may be used as well. The information as provided on the first and second challenge and response tests as explained above apply here as well.

The fourth data layer may further include a first ID, wherein the first ID may have been assigned by the administrative controller to the first controller, preferably prior to generating and/or transmitting the nested data package A0 to the first controller. At this point it is emphasized that the first ID as provided in the fourth data layer A4 cannot be extracted by the first controller from the nested data package due to the encryption of the second data layer. Hence, the second controller can compare the first ID (ID1) as obtained with the fourth data layer with a first ID (ID1') known by the first controller and transmitted by the first controller to the second controller. If these two first IDs match (ID1=ID1') than the second data layer A2 has been provided (transmitted) by the controller being intended to transmit the second data layer to the second controller. If the two first IDs do not match (ID1< >ID1') then there is a risk that the second freight data does not origin from the administrative controller and in this case the second freight data is preferably dismissed by the second controller.

As already mentioned, the fourth data layer A4 may further include second freight data. This second freight data may include pairing information configured to enabling or disabling the first controller and/or at least one third controller, to control a function of the second controller. In this sense the pairing information is a rule configured to control access or non-access to a function of the second controller by the first controller and/or by another controller. For example the pairing information may include a black list and/or a white list or entries to add or remove from at least one of these lists, wherein a controller being listed in the white list is allowed to activate or deactivate a function of the second controller. In this sense the white list is associated to said function and a controller being added to the whitelist may control said associated function. The function may be, e.g. unlocking a lock by controlling an actuator of a clutch. The function may as well be to arm or disarm an alarm system and/or switch an actuator on or off. An entry in a blacklist associated with a function blocks a controller listed in the blacklist from controlling the respective function. The controllers being added and/or removed to a blacklist and/or a whitelist may be the first controller transmitting the second layer A2 to the second controller or another controller (third controller), e.g. another smartphone or another mobile computing device.

The white and/or blacklist entries may include the public keys of the respective controllers and/or symmetric keys assigned to the respective controllers, enabling to identify the whitelisted and blacklisted controllers by a challenge and response test as explained above. It should be noted the public private keys tuples $(uk_i, ik_i)$, $(uk_j, ik_j)$, $(uk_n, ik_n)$ may be identical to the respective public private keys tuples $(uk_1, ik_1)$, $(uk_2, ik_2)$, $(uk_3, ik_3)$. But they may as well be different. The advantage of using only a single tuple per controller is a significant reduction the size of the nested data package A0 and as well of the memory requirements of the second controller(s). Thereby reducing transmission times and manufacturing costs. The advantage of using different tupels is an enhanced security level. As already indicated instead of asymmetric encryption symmetric encryption may be used and this case the tupels 'shrink' down to values, i.e. $uk_l=ik_l=sk_l$ thus the tupel $(uk_l, ik_l)$ can be replaced by $sk_l$ (for all l), wherein $sk_l$ is a symmetric key and the index I enables to distinguish different symmetric keys (e.g. l=1, 2, 3, . . . , i, j, n, . . . ). As already mentioned, the first data layer A1 may further include a first symmetric key configured for a symmetric encryption method. This first symmetric key enables a secure communication between the first and second controllers (assuming the first symmetric key has been initially provided to the second controller, e.g. upon its installation). Any communication between the first and the second controller may hence be 'tunneled' by a symmetric encryption, even those pieces of information already been encrypted otherwise, like e.g. the second data layer A2 or an optional second challenge. This tunneling reduces the chances of third parties to acquire information about the communication protocol and hence increases the security level.

Further, the first data layer A1 may include a header identifying the nature of the data package, metadata, a creation date of the nested data package and an expiry date of the nested data package. These pieces of information enable to further reduce the risk of erroneously transmitting data to a second controller, or to an unintended second controller by defining corresponding conditions. For example: If the expiry date is in the past, the second layer A2 may not be transmitted to a second controller by the first controller. If the difference between the present date and the creation date is older than a preset value, the second layer A2 may not be transmitted to a second controller by the first controller.

The first response R1 and/or the second response R2 may be an ID of the second and/or first controller, respectively. These measures enable to reduce the size of the nested data package A0 and thereby the time for its transmission and as well the memory requirements of the first and second controllers. Further, each challenge and response test provides additional security, because the recipient of the respective challenge C1, C2 can check the response being computed using the respective challenge C1, C2 as an input value, i.e. the result of the computation, R1' and R2', respectively, against the ID of the second or first controller, respectively. This provides the challenged controller the ability to check if the challenging controller is authorized. Hence, if the computed response R1', R2' and the ID I2, I1, respectively, do not match (i.e. R1'< >I2, or R2' < >I1) the challenged controller may abort the communication else it may continue.

Herein we use the term "asymmetric encryption" to references to an asymmetrically encrypted exchange of information. An asymmetric encryption uses two complementary pieces of information being referred to as public key and private key. Both keys are typically generated by a single entity. In many applications said single entity (first entity, for short) shall receive encrypted information. The first entity provides the public key to a second entity which uses the public key to encrypt a message. The encrypted message is transmitted to the first entity which can decrypt the transmitted message (only) using the private key. The asymmetric encryption is considered secure if knowledge of the private key is presumably the only possibility to decrypt the message and if the private key cannot (presumably) be extracted within a reasonable amount of time from the knowledge of the public key. Hence, it can be assumed that only an entity having the private key can decrypt a message that has been encrypted with the corresponding public key.

The most prominent asymmetric encryption method is the RSA-algorithm, but other algorithms, (e.g. Merkle-Hellman, Rabin cryptosystem, McEliece, Elliptic Curve algorithms to name only some other examples) can be used as well. The Elliptic Curve algorithm is preferred, as it enables to reduce the required CPU-time, energy consumption memory and bandwidth requirements. The term "public key of an entity A" implies that the entity A has the complementary private key being required to decrypt a message that has been previously encrypted using the public key of the entity A. If two entities A and B reciprocally exchange their public keys while maintaining the complementary private keys secret, an encrypted bidirectional communication between the entities A and B can be established. Asymmetric encryption can also be used to generate digital signatures. Again, a first entity provides a public key to a second entity and maintains the private key secret, but in this case the private key is an input parameter for (i.e., used in generation of) the digital signature being attached to some information to be digitally signed. By applying a public key to the signature, the digitally signed information receiving, second entity may obtain a value being a function of the information being signed. By comparing the result of the application of the public key to the signature by the second entity with the expected result (the value being a function of the information being signed) the receiving party may verify that the private key used for generating the digital signature and public key being applied to the signature match. This is considered as confirmation that the signed information has been provided by the first entity. Only to avoid any misunderstanding, the first controller and/or the second controller and/or the third controller and/or the administrative controller are examples of first and/or second entities.

A "symmetric encryption" is a method in which all parties taking part in the communication share a single key, herein as well referred to as "symmetric key" or "shared key". The message to be transmitted is encrypted, subsequently the encrypted message is transmitted and subsequently decrypted using the shared key and/or another key that can be extracted from the shared key within a small amount of time. The advantage of symmetric encryption is that the computational effort of en- and decryption using the shared key can be much lower than for asymmetric encryption, assuming a similar security of the encryption. As usual "security of an encryption" is a measure for the time being required to decrypt an encrypted message without having the appropriate key. The drawback of a symmetric encryption is that the shared key has initially to be distributed to the controllers thereby configuring them to communicate via a symmetric encryption method. This distribution involves a risk of unintentionally sharing the key with an eavesdropper. This can be avoided by exchanging a symmetric key using an asymmetric encryption.

The term "symmetric key" may not be misunderstood, in a sense that the key itself obeys a symmetry. The term "symmetric key" is used herein only to linguistically distinguish a key configured for a symmetric encryption algorithm from the private key and from the public key of asymmetric encryption methods.

Herein we use the phrase a controller cannot read, access or use information, although it is obviously stored in the controller's memory (e.g. because it has been transmitted to the controller). This means that the respective information can be sent or received, but not decrypted, because the controller fails to have the appropriate key. In this sense the piece of information is "not known". The information is so to speak stored but useless for the respective controller and its user. Information being stored and available to a controller is considered to be "known" by the controller. Thus, known information is stored and not encrypted or stored encrypted but can be decrypted by the respective controller.

For example, the first ID (or any other variable or parameter) can be known by the first controller and hence be stored in the first controller's memory after it has been assigned (or elsewise submitted) to the first controller (e.g. by the administrative controller). This first ID can be as well be included in the second freight data being stored but not known to the first controller. After delivery of the second data layer A2, the first ID as included in the fourth data layer A4 becomes known to the second controller, but still is unknown to the first controller. Testing them to match requires transmission of one first ID to the respective other controller. The test enables to ensure that the second layer has been transmitted to the second controller by a first controller that has been intended to transmit the second data layer A2 by the administrative controller.

A key being known by a controller can be used by the respective controller to en- and/or decrypt a message (depending on the type of key) using the known key.

The term to transmit information (or data) from a controller to another controller, is as usual, to be understood as sending the information by said "a controller" and receiving the sent information by said 'another controller'. The received information is obviously stored in a memory of the 'another controller'. But in case the information has been encrypted prior to sending it, the another controller can extract the information only in case the appropriate key is as well stored in the memory of the another controller and in this meaning 'known' or available.

Herein, as usual, the term nested data package refers information being arranged as a data structure (an object) having at least one element which itself is a data structure (another object). A nested data package can be considered as an object comprising other objects, wherein the other objects may be of the same or of a different object type. Herein, we distinguish the different nested objects by naming them layers. The outermost layer A0 is hence the nested data package. Performing an operation (in our example: decryption) on the outermost layer A0 provides the subsequent layer A1, herein referred to as first layer A1. The first layer A1 includes inter alia the second layer A2 as another object, which can be extracted from the first layer A1 and so forth. Another operation (in our examples: again a decryption or test of a digital signature) provides the third layer A3. The fourth layer may include (i.a.) a signature and the fourth layer A4 or enable to obtain the fourth data layer by decrypting the third data layer. The fourth layer A4 may include the second freight data, which again may include complex data structures like multidimensional arrays (examples are the black and the whitelists) or as well simpler data types liked integers (e.g. the first ID ID1).

The term metadata refers as usual to information that is related to information provided by nested data package. Metadata might be useful e.g. be to displayed to the user of the system (for example the name or position of a door being equipped with a the second controller) but metadata is not necessary for the functionality of the pairing method. Metadata can be e.g. included in the first and/or second freight data but as well in any layer of the nested data package.

As already apparent, the term "data layer" is a synonym for the term "data structure". A data layer may include other data layers and at the same time the data layer may be included in yet another data layer. A data layer may hence be a sub structure of a nested data package. The term "nested" means as usual, that at least one data layer is fully included in another data layer. This another data layer may include one or more further data layer(s), which as well may be nested data packages. Further, said at least one data layer as well as said another data layer may optionally include one or more further data layers, which may be nested or not. Generating a data layer hence implies allocating memory for the data layer and storing at least the information to be included in the data layer in the correspondingly allocated memory. A data layer may thus consist of only a single other data layer, for example an encrypted other data layer.

As already indicated above, the second controller may be a member of a group of second controllers sharing the second public key and the second private key. To maintain legibility, we did not always refer to "the at least one second controller which may optionally be a member of a group of second controllers sharing at least the second private key and/or the second public key". But it is clear to the skilled person that the term "the second controller" always references to said at least one second controller.

BRIEF DESCRIPTION OF THE DRAWINGS

In the following, the invention will be described by way of example, without limitation of the general inventive concept, on examples of embodiment and with reference to the drawings.

DETAILED DESCRIPTION

Figure 1:
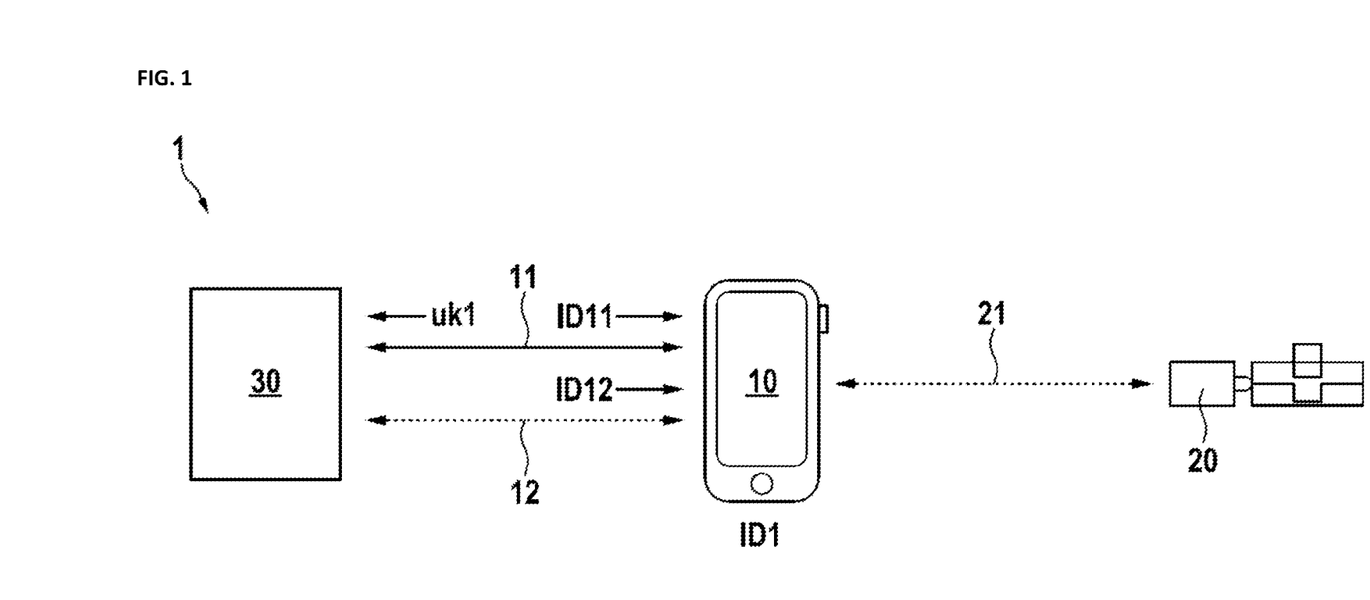
FIG. 1 shows a system comprising an administrative controller, a first controller and a second controller.

The system 1 in FIG. 1 includes an administrative controller 30, a first controller 10 (a mobile computing device) and a second controller 20.

The administrative controller 10 is a computing device. Typical examples are a personal computer, a workstation, a tablet computer and the like.

An example of a first controller 10 is a mobile computing device (a laptop, a tablet computer, a smartphone, a smart watch, . . . ).

An example for the second controller 20 may be any computing device that controls access to data and/or a room and/or control over a device. For example, the second controller could be an electronic door lock (as depicted), a computer, a cash machine, a controller of an actuator of a door or the like.

These computing devices have in common that they include at least a CPU, a memory and at least one communication port (e.g. an antenna, a com port, an ethernet port) configured to establish a communication channel providing a data link to at least one other computing device in particular to one of the other controllers). Herein we implicitly assume using wireless communication channels, but the invention is not limited to using these. Cable connections may be used alternatively.

The administrative controller 30 may establish at least a first first (preferably bidirectional) data link via a first first communication channel 11 with the first controller 10. In a preferred example, the first first communication channel 11 is an internet connection. In a particularly preferred example, the administrative controller 30 may establish at least a second first (preferably bidirectional) data link via a second first communication channel 12 with the first controller 10. In a preferred example, the second first communication channel 12 involves a telephone connection, e.g. via some cell phone standards. For example, the administrative controller 30 may be configured to send a short text message to the first controller 10 via the second first data link 12. If no distinction between the two first data links is required, we will simply refer to "the first data link". The communication via the first data link 11, 12 is preferably encrypted, e.g. using an asymmetric encryption, at least for the exchange of a symmetric key, subsequently enabling to securely use symmetric encryption.

Using at least two different first data links 11, 12 enables a multi-factor remote authentication of the first controller: In an example, the administrative controller may assign the first communication device a first ID1 (i.e. a name enabling to identify the first device). The first ID ID1 may be a word, a number, a letter, a symbol, or any combination of those. Preferably, a first portion ID11 of the first ID ID1 is transmitted via the first first data link 11 to the first controller 10 and a second portion ID12 of the first ID1 may be transmitted via the second first data link 12, wherein the first first data link 11 and the second first data link 12 are different data links. The first controller may hence reconstruct the assigned first ID1 based on the (at least two) portions ID11, ID12 of the first ID1, based on a given operation. For example, the portions of the first ID1 may be multiplied, divided, summed, subtracted, concatenated, subjected to a bitwise AND or OR or NOT or XOR operator, to name only a few. Essentially any operation or combination of operations can be used. In a mathematical notation ID1=ID11∘ID12. After the transmission, the administrative controller 30 and the first controller 10 each have the information about the first ID ID1. Only to enable a distinction, we use ID1 for the first ID as stored in the memory of the administrative controller 30 and ID1' for the first ID as stored in the memory of the first controller 10, in case we have to distinguish between them. In an alternative example, the first ID1' may be initially present in the first controller's memory and may be transmitted, preferably as well using at least two different data links 11, 12 to the administrative controller 30. Finally, it is only relevant that the first IDs known to the administrative controller 30 and the first controller 10 are identical.

In addition and/or alternatively, the administrative controller may send an encrypted initial data package to the first controller using the first data link 11. Using the second data link 12 the administrative controller may send a key enabling the first controller to decrypt initial freight data being included in the initial data package. The initial freight data may, e.g. include the first ID, and/a (preferably symmetric) key for en (- and de)crypting further data being exchanged between the first controller and the administrative controller via the first and/or second data links 11, 12. The ID and the key may be identical, alternatively the ID may be a number of bits of the key (or vice versa). For example, the lowest 16 bits of the key may define the ID of the first controller.

As well via the first data link 11, 12, the first controller 10 may transmit a key uk1 of an encryption mechanism to the administrative controller 30. In a preferred example, the key uk1 is a public key (first public key) of an asymmetric encryption method. The corresponding first private key ik1 is preferably maintained 'private' by the first controller 10. Alternatively, the key uk1 could as well be a symmetric key (in this case uk1=ik1). Below, we will assume that the corresponding encryption method is asymmetric, however, the examples discussed herein are not limited to this preferred choice.

In a preferred example, there exists a testable relation between the first ID1 being assigned by the administrative controller 30 to the first controller 10 and the first public key uk1. The relation may be configured to enable the administrative controller 30 to check if the first public key uk1 has not been generated by the first controller 10, i.e. by another entity trying to compromise the system. An example relation is uk1 MOD ID1=c, c being a constant. For example, the first public key uk1 may be a multiple of the first ID ID1 (i.e. c=0). The first controller may hence abort if uk1 MOD ID1<>c is true, wherein c a given constant and only continue, if k1 MOD ID1=c is true. Alternatively or in addition, the first controller 10 may transmit the first key uk1 to the administrative controller 30 using the first ID ID1 as symmetric key or as an asymmetric key for encrypting the first key uk1. Hence, only the administrative controller 30 can decrypt the first key uk1.

As already apparent, the first controller 10 may receive information in the form of a data package from the administrative controller 30. The first controller 10 may next process the information and e.g. forward at least a portion of the data package to the second controller via at least one second data link 21 using a second communication channel 21, again we use the same reference numeral for the communication channel and the data link established via the communication channel.

Figure 2:
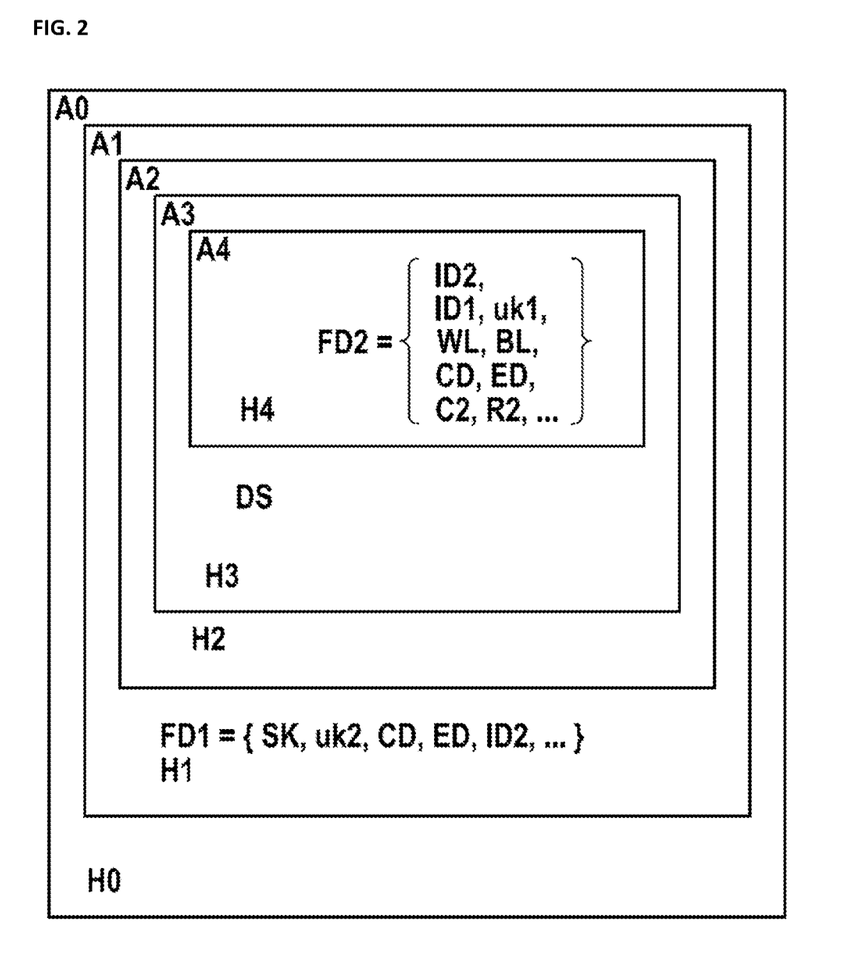
FIG. 2 shows a general structure of a nested data package.

A nested data package 100 which can preferably be generated by the administrative controller 30 and which nested data package 100 can preferably be transmitted from the administrative controller 30 via the first data link 11,12 to the first controller 10 is sketched in FIG. 2.

The data package A0 has at least 4 layers A1 to A4. The package itself is referred to zero'th layer A0. As fourth layer A4, the nested data package may include second freight data FD2, i.e. data being intended to be delivered from administrative controller 30 to the second controller 20. The second freight data FD2 may, for example, include at least the first ID ID1 assigned to the first controller 10 and/or a hash value of the first ID1 and/or the first (preferably public) key uk1 of the first controller 10, and/or a second ID ID2, at least one white list entry and/or at least one blacklist entry and/or at least a second challenge C2 and/or a corresponding expected second response R2. The second freight data FD2 may further include a creation date CD and/or an expiry date ED and/or a serial number of the nested data package and/or at least a portion of a white list WL and/or at least a portion of black list BL. The white list and/or the blacklist may include at least one ID of a further controller and/or the first controller 10. As already apparent, the second freight data FD2 can include any kind of information that shall be delivered by via a first controller to a second controller without enabling the first controller or any other entity to obtain knowledge of the second freight data FD2, while protecting the second freight data FD2 against unauthorized alteration and/or unauthorized amendment.

If the second freight data FD2 includes a second ID ID2, the second controller 20 may compare the second ID ID2 as provided in the nested data package with the second controller's ID2'. If these two IDs match do not match (ID2<>ID2'), the second controller may dismiss the second freight data FD2 and/or generate an alarm signal. If the two second IDs match (ID2=ID2'), the second controller 20 may continue, e.g. by using the second freight data FD2.

If the second freight data FD2 includes the first ID ID1, the second controller 20 may compare the first ID1 as provided in the second freight data FD2 with a first ID1' being transmitted from the first controller 10 to the second controller 20 and in case these two IDs do not match (ID1<>ID1'), the second controller 20 may dismiss the second freight data FD2 and/or generate an alarm signal. If the two first IDs match (ID1=ID1'), the second controller 20 may continue, e.g. by using the second freight data FD2.

If the second freight data FD2 includes the first public key uk1, the second controller 20 may encrypt a message R2 using the first public key uk1 and transmit the encrypted message C2 to the first controller 10. The first controller 10 may decrypt the encrypted message C2 using the first private key ik1 and perform an action based on the message. For example, the first controller 10 may transmit a response R2', wherein the response R2' is a function of the decrypted message or the decrypted message itself to the second controller 20. For example, the response R2' can be at least a first portion and/or a hash value of at least a portion of the message C2 to the second controller 20. The encrypted message C2 presents thus a challenge to the first controller 10, and if the transmitted response R2' matches the expected response R2 (R2=R2'), the second controller 20 may continue using the second freight data FD2. In case the transmitted response R2' does not match the expected response R2 (R2<>R2') the second controller 20 may abort communication with the first controller 10 and/or generate an alarm signal and/or dismiss the second freight data FD2.

Attached to the fourth layer A4 may be an optional a digital signature DS. The digital signature DS enables the second controller 20 to test whether the fourth data layer A4 has initially been generated by the administrative controller 30. The digital signature DS and the fourth data layer A4 are both included in the third data layer A3. In case the digital signature DS is omitted, the third and the fourth data layer may be identical (A3=A4).

The third data layer A3 is preferably encrypted using the second public key uk2, i.e. a public key of the second controller 20. The second public key uk2 may have been stored in the administrative controller 30 prior to installation of the second controller 20, for example already at the factory. Alternatively, the second public key uk2 may be entered manually into a database of the administrative controller 30 or may have been provided in any other suitable fashion to the administrative controller 30.

The decrypted third layer A3 may form or be a part of the second layer A2. Hence, assuming the key being required for decryption the second layer A2 is known only by the second controller 20, only the second controller 20 can decrypt and hence make use of the second freight data FD 2 being optionally signed by the signature CD.

The second layer A2 and optional first freight data FD1 and/or a header may be joined thereby forming at least a part of the first layer A1. Encrypting the first layer A1, optionally together with further freight data and/or a header H1 using the first public key uk1 provides the nested data package A0 or at least a portion thereof. An example of information that may be included in the first freight data FD1 can be, e.g. a symmetric key sk1 enabling a symmetric encryption of any communication between the first controller 10 and the second controller 20. The symmetric key sk1 can be stored initially in the second controller 20 or be transmitted from the first controller 10 to the second controller 20. Further, the first freight data FD 1 may include the second public key uk2. In this case, for example the first controller 10 may first transmit the first symmetric key sk1 (be it part of the first freight data 1 or generated by the first controller 10 (e.g. based on at least a portion of the first freight data FD1) or less preferred obtained from another source) asymmetrically encrypted using the second public key uk1 to the second controller 20. Subsequently, preferably any communication between the first controller 10 and second controller 20 may be symmetrically encrypted.

Further examples of optional or alternative elements of the first freight data FD1 are the second ID ID2 of the second controller 20, a void date VD after which the nested data package A0 is void and may be (shall be) dismissed (e.g. deleted). A creation date CD of the nested data package. Further information may be provided as well.

As already apparent, even if not always explicitly mentioned, each layer A0 to A4 may have a header H0 to H4, respectively.

Figure 3:
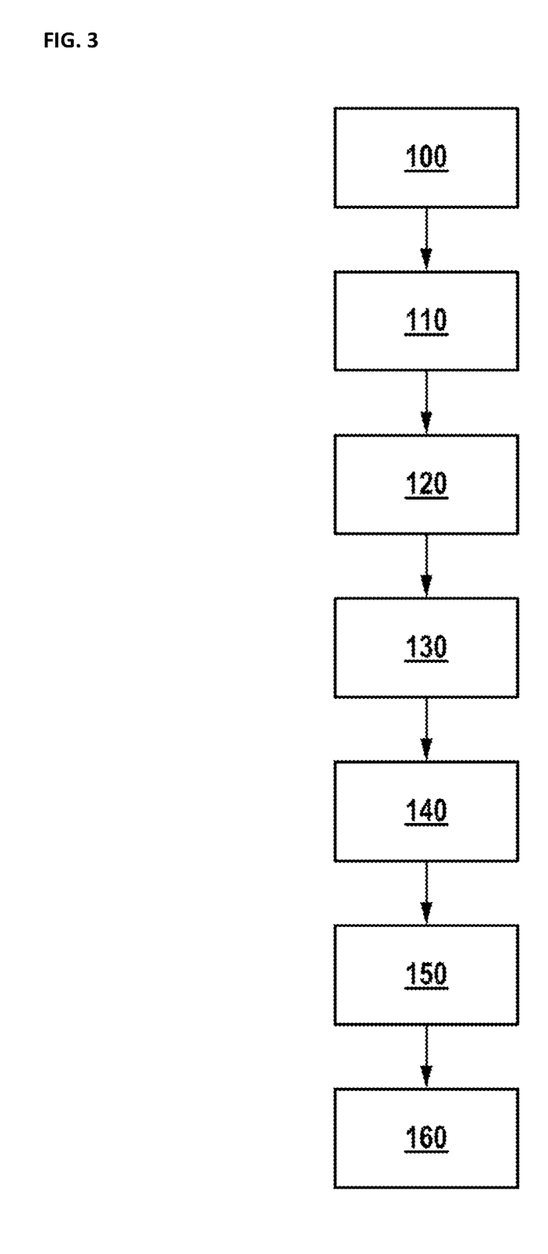
FIG. 3 shows a flow diagram of a method configured to submit pairing information from an administrative controller via a first controller to a second controller using the nested data package of FIG. 1.

A method for submitting the second freight data FD2 from the administrative controller 30 to the second controller 20 is schematically sketched in FIG. 3. The method may be used, e.g. to provide second freight data FD2, comprising e.g. a white list entry and/or a black list entry of the first controller 10 (e.g. a cell phone) to a door lock 20 (being an example of a second controller 20).

In a first step 100, the administrative controller 30 and the first controller 10 may be paired. This administrative controller 30-first controller 10 pairing step may include, e.g. assigning the first controller 10 a first ID1 by the administrative controller 30. This assigning may involve at least a two-factor authentication method, for example using at least two different data links 11 and 12 as explained above to thereby reduce the risk of a successful fishing or man in the middle attack. At least one of the communication channels 11, 12 may include entering information (e.g. provided via SMS, letter (paper), photo tan, or any other communication channel) into an HMI (human machine interface) of the first controller 10, typically implemented as a so-called app. This piece of information may be used to retrieve the first ID1, e.g. it may be a first portion ID11 and/or a second portion ID12 of the first ID1. Further, in this step 100 the first controller 10 may as well submit a first public key uk1 to the administrative controller 30 and as well the administrative controller 30 may send a public key uk3 of the administrative controller 30 to the first controller 10, thereby enabling the first controller 10 to send encrypted information to the administrative controller 30, e.g. so send the first public key uk1 encrypted to the administrative controller 30. Thereby, the first public key uk1 remains unknown to third parties.

In addition and/or alternatively, the administrative controller may send in step 100 an encrypted initial data package comprising encrypted initial freight data to the first controller using the first data link 11 or the second data link 12. Preferably the initial data package includes a digital signature enabling to verify the originator of the initial freight data. Thus, the initial freight data is preferably digitally signed and encrypted or encrypted and digitally signed. We will not distinguish between these two possibilities as they the sequence of signing and encrypting can be swapped.

Using the respective other data link 12, 11, the administrative controller may send a key enabling the first controller to decrypt initial freight data being included in the initial data package. Further, the administrative controller may send identifying information enabling to identifying the initial data package, e.g. a hash value of the initial data package or of information provided with the initial data package, e.g. of a project ID.

The initial freight data may, e.g. include the first ID, and/a (preferably symmetric) key for en (- and de)crypting further data being ex-changed between the first controller and the administrative controller via the first and/or second data links 11, 12. This key may be a single use key, e.g. for providing the administrative controller a public key of the first controller or a symmetric key in a response message. Subsequently, administrative controller may send e.g. the nested data package to the first controller, preferably using an encrypted communication.

As already explained above, the ID and the key may be linked by some mapping. For example, the ID may be a number of bits of the key (or vice versa). For example, the lowest 16 bits of the key may define the ID of the first controller. Thus, after decryption (and testing of the optional digital signature) the first controller can use the initial freight data. An unauthorized listener intercepting only the initial data package, cannot use the initial freight data.

Using the information exchanged during step 100, the administrative controller 30 may generate at least one nested data package A0, preferably at least one nested data package A0 as shown in FIG. 2. The step of generating the nested data package is symbolized in FIG. 3 by step 110.

Subsequently, the administrative controller 30 transmits the nested data package A0 to the first controller 10. This transmission is represented as step 120.

In step 130, the transmitted nested data package A0 can be decrypted by the first controller 10 thereby obtaining the first nested data layer A1. Hence, the first controller 10 thereby obtains first freight data, i.e. data being usable by the first controller 10. This first freight data 10 may include information relating to the second controller 20, e.g. a second ID ID2, a geographic location of the second controller, the second public key uk2 etc. The first freight data FD1 may include a creation date CD, an expiry date ED, etc. as explained above. Further, the first controller 10 may obtain by decrypting the nested data package A0 the second data layer A2 (being included in the first data layer A1). However, the first controller 10 is preferably unable to decrypt the second data layer A2 as the corresponding decryption key is preferably stored only in the memory of the second controller 20 and optionally in the administrative controller 30, but not stored by the first controller 10. This decryption key is referred to as second private key ik2.

In step 140, the first controller 10 transmits the second data layer A2 to the second controller 20, the latter being able to decrypt second layer A2 in step 150 and to thereby obtain the third optional data layer A3.

In the optional step 150, an optional digital signature of the fourth data layer A4 is tested. Only if it is considered valid, the second freight data FD2 is not considered as corrupted.

If the second freight data FD2 is considered corrupted, it may be deleted and/or sent back to the administrative controller and/or a supervising controller by any appropriate communication channel with the information that the second freight data FD2 was considered corrupted. In case the second freight data FD2 was found to be valid it may be used as intended.

Under the optional premise that the optional step 150 provides that the second freight data is not corrupted, the method may continue with step 160. In step 160, the first controller 10 and the second controller 20 may reciprocally authenticate: As suggested above, the first public key uk1 may be a portion of the second freight data FD2 and hence be used by to verify the legitimacy of the second controller 20 by the first controller 10 and as well the legitimacy of the first controller 10 by the second controller 20. For example, the second controller 20 may encrypted a known piece of information (a message) using the first public key uk1 as included in the second freight data FD2 and transmitted the encrypted known piece of information to the first controller 10. The term "known piece of information" in this context means the respective piece of information is stored in the memory of the first controller 10 or can be derived from information in said (first) memory. For example, the known piece of information may have been transmitted in the first controller 10-administrative controller 30 pairing step from the administrative controller 30 to the first controller 10 and/or from the first controller 10 to the administrative controller 30. In any case, the administrative controller 30 may include the known piece of information in the second freight data FD2. Alternatively, the known piece of information may be known ab initio by the second controller 20 and by the administrative controller 30 and may be included in the first freight data FD 1. In any of these examples, the first controller 10 may hence decrypt the encrypted known piece of information transmitted from the second controller 20 to the first controller 10, thereby obtaining the previously encrypted known piece of information and compare it with the expected (i.e. initially) known piece of information. If these expected and the decrypted known pieces of information are identical, there is a very low probability that the second controller 20 is not legitimate and the method may continue, elsewise the method may stop and/or include emitting an alarm signal. Similarly, the first controller 10 may transmit the decrypted known piece of information to the second controller 20. If the transmitted decrypted known piece of information is identical with the initially encrypted known piece of information (prior to its encryption), the risk that the first controller 10 is not legitimate is very low and the method may continue, elsewise the method may stop and/or include emitting an alarm signal.

If the (preferably reciprocal) authentication of the first controller 10 or/and second controller 20 is successful, the method may proceed to step 170 comprising second controller 20 to accept the further portions of the second freight data FD 2, e.g. a whitelist entry of the first controller 10 and/or of any other controller. In another option the second controller 20 accepts at least one blacklist entry, e.g. of the first controller 10 and/or of any other controller.

The first freight data FD1 may provide the first controller 10 the information of the intended recipient of the second data layer, e.g. a second ID2. Subsequently, the first controller 10 may submit the second data layer A2 to the second controller 20. It is noted that the first controller 10 has knowledge about the second data layer A2, but as the second data layer A2 is preferably encrypted using the second public key uk2 the first controller 10 cannot retrieve any information included in the second data layer. Once the second data layer A2 has been transmitted from the first controller 10 to the second controller 20, the second controller 20 can decrypt the second data layer A2, thereby obtaining the optional third data layer A3. The optional third data layer A3 enables the second controller to verify the origin of the data attached to the digital signature, i.e. to verify the origin of the fourth data layer. The second freight data FD2 may be used to verify that the first controller 10 is a legitimate first controller 10. This means that the initial data package A0 has been submitted initially to said (legitimate) first controller 10. Another controller pretending to be the first controller, e.g. by copying a MAC-Address of a legitimate first controller 10, can be identified as non-legitimate.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

The wording "A comprises B" as well as "A includes B" shall be understood in that the entity A comprises/includes/contains at least the entity B. In both cases, the entity B is so to speak a part or a portion of the entity A. Generally (unless apparent from the context), the entity B may be the only part or portion of the entity A, while it is not excluded that at least one other entity is as well a part or portion of the entity A.

While various modifications and alternative forms, of implementation of the idea of the invention are within the scope of the invention, specific embodiments thereof are shown by way of example in the drawings and are described above in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

It will be appreciated to those skilled in the art having the benefit of this disclosure that this invention is believed to provide a method, an apparatus and and data structure which may of course optionally and/or alternatively be embodied in part or in whole using firmware and/or hardware components (such as combinatorial logic, Application Specific Integrated Circuits or ASICs, Field-Programmable Gate Arrays or FPGAs, or other hardware or some combination of hardware, software and/or firmware components), and may include an specific electronic circuitry or a processor controlled by instructions stored in a tangible, non-transient memory medium. The computer-usable or computer-readable medium may be, for example, an electronic, magnetic, optical, electromagnetic, infrared, or semiconductor system, apparatus, device, or propagation medium. For example, computer-usable or computer-readable medium may include a tangible non-transitory storage medium, such as, without limitation, a random access memory (RAM), a read-only memory (ROM), an erasable programmable read-only memory (EPROM or Flash memory), a compact disc read-only memory (CDROM), and/or an optical storage memory medium, or any other memory, or combination thereof, suitable for storing control software or other instructions and data. The computer-usable or computer-readable medium may comprise and/or be complemented with an apparatus that contains, stores, communicates, propagates, or transports program code for use by or in connection with the instruction execution system, apparatus, or device. The computer program product may comprise program code stored in a computer readable medium that, when executed on a computing device, causes the computing device to perform and/or govern one or more of the processes described herein. Each of a computer program code configured to effectuate embodiments of the method discussed above (for example, those employing an embodiment of the disclosed nested data package), a processor or computer usable medium (in one specific case—non-transitory tangible storage medium) having such computer readable program code and/or an embodiment of a nested data package stored thereon, and a computer program code comprising such computer usable medium are within the scope of the invention. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 1 system comprising at least a administrative controller, a first controller and a second controller
10 first controller
11 first first data link/first first communication channel
12 second first data link/first first communication channel
20 second controller
21 second data link/second communication channel
30 administrative controller
100 nested data package
110 method step
120 method step
130 method step
140 method step
150 method step
160 method step
A0 nested data package
A1 first layer of the nested data package
A2 second layer of the nested data package
A3 third layer of the nested data package
A4 fourth layer of the nested data package
DS digital signature
FD1 first freight data
FD2 second freight data
ID1 ID of the first controller
ID11 first portion of ID1
ID12 second portion of ID1
ID2 ID of the second controller
uk1 first public key
ik1 first private key
sk1 first symmetric key
uk2 second public key
ik2 second private key

The invention claimed is:
1. A nested data package comprising first freight data and configured to provide, using a first controller as a transporter, pairing information or other second freight data from an administrative controller to a second controller,
wherein:
(1) the nested data package comprises at least a first data layer being encrypted using a first key of the first controller, wherein the at least the first data layer comprises at least the first freight data and a second data layer,
and
(2) condition (A) is satisfied, wherein the second data layer is encrypted using a second key of the second controller and comprises a third data layer, and the third data layer comprises at least (i) a digital sig- nature of the administrative controller that is attached to a fourth data layer and (ii) the fourth data layer, or condition (B) is satisfied, wherein the second data layer comprises at least (a) the digital signature of the administrative controller attached to the third data layer and (b) the third data layer, and wherein the third data layer is encrypted using a second key of the second controller and comprises the fourth data layer, and (3) wherein the fourth data layer comprises at least the second freight data that comprise at least the first key and/or a first ID of the first controller and/or a second expected response of the first controller, and (4) wherein the first controller is prevented from accessing the second freight data.

2. The nested data package of claim 1, characterized in that the first freight data comprises identification information of the second controller.

3. The nested data package of claim 2, characterized in that identification information of the second controller comprises at least one of a first challenge and/or a first expected response to the first challenge when imposed to the second controller and/or a symmetric key for a symmetric encryption method and/or a second ID of the second controller and/or a public key of the second controller.

4. The nested data package of claim 1, wherein the fourth data layer further comprises the second freight data, wherein said second freight data comprises pairing information of the first controller or at least one third controller, wherein the pairing information is a rule for controlling access or non-access of (i) the first controller or (ii) the at least one third controller to a function of the second controller.

5. The nested data package of 1, wherein the first freight data further comprise at least one of a header identifying a nature of the nested data package, a metadata, a creation date of the nested data package, and an expiry date of the nested data package.

6. The nested data package of claim 1, wherein the second expected response is a function of the first ID of the first controller.

7. The nested data package of claim 1, wherein the digital signature of the administrative controller is based on a private key of the administrative controller.

8. The nested data package of claim 1, wherein an outer layer of the nested data package and/or the first data layer of the nested data package have a digital signature of the administrative controller configured to enable verification of the administrative controller as an originator of the first data layer.

9. A method comprising:

generating the nested data package of claim 1 by performing at least the following steps with the administrative controller:

retrieving the first key and the second key;

generating the fourth data layer comprising at least the first key and/or the second expected response as the second freight data to the fourth data layer;

when the condition (A) is satisfied, adding the digital signature of the administrative controller to the fourth data layer to thereby obtain the third data layer or, when the condition (B) is satisfied, encrypting the fourth data layer using the second key to thereby obtain the third data layer;

when the condition (A) is satisfied, generating the second data layer by encrypting the third data layer using the second key or, when the condition (B) is satisfied, adding the digital signature of the administrative controller to the third data layer to thereby obtain the second data layer;

generating the first data layer by adding first freight data to the second data layer; and generating the nested data package by encrypting the first data layer using the first key.

10. The method of claim 9, wherein the second expected response is stored in the fourth data layer, and further comprising:

assigning the second expected response to the first controller, the assigning including:

with the administrative controller: storing a first ID, dividing the first ID into at least two portions and sending the at least two portions of the first ID to the first controller via at least two different communication channels, with the first controller: reconstructing the first ID by the first controller and storing the first ID as the second expected response;

with the administrative controller: storing the first ID as the expected second expected response in the fourth data layer.

11. The method of claim 10, comprising:

with the administrative controller, prior to sending the at least two portions of the first ID, obtaining the first key, encrypting at least one of the at least two portions of the first ID using the first key, and executing the sending the at least two portions of the first ID via the at least two different communication channels, wherein said sending includes using the at least two different communication channels to transmit each portion of the at least two portions of the first ID to the first controller.

12. The method of claim 9, further comprising:

with the first controller: obtaining a first public key and a corresponding first private key, dividing the first public key into at least two portions and sending the at least two portions of the first public key via at least two different communication channels to the administrative controller, and with the administrative controller: receiving the at least two portions of the first public key, reconstructing the first public key of the first controller based on the previously received at least two portions of the first public key, thereby retrieving the first public key.

13. The method of claim 9, comprising: adding, with the administrative controller, at least a first symmetric key for a symmetric encryption method to the first data layer prior to encrypting the first data layer using the first public key.

14. A tangible non-transitory memory storage comprising instructions for at least one processor for executing the steps of the method according to claim 9 performed by the first controller and/or the second controller and/or the administrative controller.

15. A controller comprising:

the tangible non-transitory memory storage of claim 14.

16. A method for enabling a secure communication between a first controller and a second controller, comprising:

a) generating the nested data package of claim 1 by performing at least the following steps with the administrative controller:

retrieving the first key and the second key;

generating the fourth data layer comprising at least the first key and/or the second expected response as the second freight data to the fourth data layer;

when the condition (A) is satisfied, adding the digital signature of the administrative controller to the fourth data layer to thereby obtain the third data layer or, when the condition (B) is satisfied, encrypting the fourth data layer using the second public key to thereby obtain the third data layer;

when the condition (A) is satisfied, generating the second data layer by encrypting the third data layer using the second public key or, when the condition (B) is satisfied, adding the digital signature of the administrative controller to the third data layer to thereby obtain the second data layer;

generating the first data layer by adding the first freight data to the second data layer; and generating the nested data package by encrypting the first data layer using the first key;

b) with the administrative controller: transmitting the generated nested data package to the first controller;

c) with the first controller: receiving the transmitted nested data package, decrypting the nested data package thereby obtaining the first data layer and sending a first challenge to the second controller, wherein the first challenge and the corresponding first expected response are obtained from and/or generated based on the first freight data;

d) with the second controller: receiving the first challenge and based on the first challenge, generating a response to said first challenge and transmitting the generated response to the first controller;

e) with the first controller: receiving the generated response from the second controller and comparing said generated response with the first expected response obtained from and/or generated based on the first freight data, and - only in case the generated response from the second controller matches the expected response - continue with step f);

f) with the first controller: transmitting the second data layer to the second controller;

g) with the second controller: receiving the transmitted second data layer, and (g1) in case when the condition (A) is satisfied, decrypting the received second data layer, thereby obtaining the third data layer including the signed fourth data layer, verifying the digital signature and continuing with step h) only in case the digital signature is valid, or (g2) in case when the condition (B) is satisfied, verifying the digital signature and continuing with step h) only in case the signature is valid and extracting the third data layer from the second data layer and decrypting the third data layer thereby obtaining the fourth data layer;

h) with the second controller: encrypting an instruction to the first controller to send the first ID previously received from the administrative controller to the second controller using the first public key as comprised in the fourth data layer and transmitting the encrypted instruction to the first controller;

i) with the first controller: receiving the transmitted encrypted instruction, decrypting the instruction and transmitting the first ID to the second controller;

j) with the second controller: receiving the first ID from the first controller and comparing the first ID with an expected first ID and continue with step k) only in case the first ID matches the expected first ID, else proceed to step 1), k) considering information provided with the fourth data layer as valid;

l) considering the information provided by the fourth data layer as corrupted.

17. A controller comprising:

a tangible non-transitory memory storage storing thereon the nested data package of claim 1.

\* \* \* \* \*